UNITED STATES PATENT OFFICE.

FRANK A. HEADSON, OF MILWAUKEE, WISCONSIN.

HEAT-INSULATING COMPOSITION AND ARTICLES MADE THEREFROM.

1,307,548. Specification of Letters Patent. Patented June 24, 1919.

No Drawing. Application filed October 2, 1918. Serial No. 256,500.

*To all whom it may concern:*

Be it known that I, FRANK A. HEADSON, a citizen of the United States, residing in Milwaukee, in the county of Milwaukee and State of Wisconsin, have invented certain new and useful Improvements in Heat-Insulating Compositions and Articles Made Therefrom, of which the following is a specification.

This invention relates to that class of heat-insulating compositions which are adapted to be used in making heat-insulating walls of furnaces or other structures, or to be made into heat-insulating bricks, blocks or similar articles, and to articles made therefrom.

The principal object of the invention is to provide a simple, economical and efficient heat-insulating composition or compound, and heat-insulating bricks, blocks or other articles made therefrom.

Other and further objects of the invention will appear from the following description and from an inspection of the accompanying drawings, which are made a part hereof.

Matter herein described and shown but not claimed, and the process herein described but not claimed, will be found described and claimed in a copending application for Letters Patent of the United States, Serial No. 143,722, filed by me on January 22, 1917, for process of making a heat-insulating composition, and in an application Serial No. 256,501, filed of even date therewith in my name, for Letters Patent of the United States for heat-insulating composition and articles made therefrom, to which reference is made.

This invention consists in the combination of elements and in the heat-insulating composition or compound and articles made therefrom, herein described and claimed.

In making a composition of matter or material for heat-insulating purposes, and an article of manufacture, such as a brick or wall of a furnace, or other structure, in accordance with my invention, I provide a suitable quantity of diatomaceous earth or diatomaceous earth and asbestos, for making a batch of the material, and a sufficient quantity of water for moistening the same.

The diatomaceous earth,—sometimes called Kieselguhr, infusorial earth, or silica—and the asbestos are disintegrated, pulverized, or reduced to a finely divided state by grinding or crushing said materials in any suitable ordinary and well known manner. I prefer to disintegrate or pulverize the diatomaceous earth and the asbestos separately, and then to intermix them in suitable proportions, and add to the mixture a sufficient quantity of water to moisten the mass so that it will be of the desired consistency for moulding in an efficient manner, although it will be readily understood that the diatomaceous earth and asbestos may be ground or pulverized to any desired extent after being mixed together in suitable proportions.

I have found in practice that a composition of matter or compound for heat-insulating purposes may be made in accordance with my invention by combining and treating the following described elements in the following proportions, and in the manner herein described:

Diatomaceous earth, 75 per cent;

Asbestos (finely divided) 25 per cent., and

Water sufficient to moisten the mass to the desired consistency suitable for molding.

It will be readily understood by those skilled in the art that the proportions of diatomaceous earth and asbestos may be varied to a considerable extent without departing from the spirit of my invention, although the use of the above mentioned elements in the proportions above set forth, or in approximately the proportions designated has been found in practice to be quite satisfactory for the purposes for which the invention is intended.

The material consisting of or comprising diatomaceous earth and asbestos, in approximately the above mentioned proportions, when moistened with water, is, by preference, thoroughly stirred or puddled so as to be of uniform consistency throughout and form a homogeneous mass of suitable consistency for molding.

The mixture may be worked or puddled for several hours or for any desired length of time, until it is of the desired uniform consistency throughout, suitable for molding as above indicated, and then molded, cut or formed into bricks, blocks, slabs or similar articles suitable for use for heat-insulating or heat-resisting purposes when completed.

During the operation of molding, the material to be operated upon is, by preference, subjected to pressure, the degree of which may vary in accordance with the size or dimensions of the article to be molded. A pressure of approximately 200 pounds per square inch, is sufficient and satisfactory in most instances. Greater pressure should be employed in molding relatively large articles or blocks, and relatively less pressure would be required for articles of comparatively small dimensions. The pressure should ordinarily be sufficient to properly form the article to be molded, as will be readily understood by those skilled in the art. The proportion of water used for making molded articles should be sufficient to properly moisten the mass to the desired consistency for molding in an efficient manner without causing water to run out of the mold during the molding operation, or while the mass is being subjected to the desired pressure.

I have found in practice that entirely satisfactory results are obtained by moistening the mass of diatomaceous earth and asbestos in a finely divided condition, with a quantity of water equivalent to approximately one-third of the weight of the original mass to be moistened thereby.

After molding the material into the form of bricks, slabs or other articles, the articles are thoroughly dried. This may be accomplished by heating the material or article to a sufficient temperature for a sufficient length of time to thoroughly remove all moisture from the material. The bricks, slabs, or other articles thus obtained, after having been thoroughly dried, are, when desired, placed in a kiln and burned or calcined.

Bricks, slabs, or other articles suitable for heat-insulating purposes and consisting of diatomaceous earth and asbestos, comminuted and intermixed in suitable proportions, as above indicated, are, in the process of burning, subjected to a gradually increasing temperature such as will not cause unnecessary cracking, until a temperature sufficient to calcine, bake or burn the material, preferably at a red heat, is reached. The calcining or burning temperature indicated is maintained for a sufficient length of time to properly bake, calcine or burn the material. The time and degree of temperature may vary according to the degree of hardness desired, or according to the degree of temperature to which the material or article is to be subjected in use. In practice, satisfactory results have been obtained by subjecting the material to a temperature of approximately 2000° F. to 2800° F., and maintained for a period of from 9 to 144 hours, or thereabout, according to the degree of hardness of the material desired, or according to the degree of temperature to which the material is to be subjected in use, as already suggested. The articles or material having thus been calcined or burned for the desired length of time and at the desired temperature, are allowed to gradually cool, and are then in finished form and ready for use for heat-insulating purposes, or for any desired purpose.

It has been found in practice that bricks, slabs, blocks or similar articles made of material such as diatomaceous earth, or of diatomaceous earth and asbestos, comminuted and intermixed, but not calcined or burned before being molded or formed, are liable to shrink and, in some instances, to warp or to become distorted during the process of burning the same or when subjected to the action of heat when in use. It is of course very desirable that such shrinkage and warping of the molded or completed material or articles be prevented. In order to accomplish this, and to provide a heat-insulating material or composition, or articles made therefrom, I provide a suitable quantity of diatomaceous earth, or diatomaceous earth and finely divided asbestos, which I reduce to a finely divided state or comminuted form by grinding or crushing the same in or by means of a suitable crushing device which may be of any ordinary well known or desired form. Said material is calcined or burned before being molded, which operation of calcining may be accomplished by subjecting the material to a temperature, by preference, sufficient to bring the material to a red heat, but below the melting point of the material. A temperature of approximately 2000° F. to 3000° F. or more, but, by preference, below the fluxing temperature of the material, and above the temperature to which the material is to be subjected in use, maintained for a period of approximately six hours more or less, has been found to produce satisfactory results. The temperature may vary to a considerable extent above or below the stated degrees of temperature, and the time of burning may be in excess of, or less than the time above mentioned, according to the temperature to which the material is to be subjected in use.

The disintegrated and calcined or burned material thus obtained is then, by preference, moistened by the addition of a liquid, such as water, or by adding a quantity of other moistening or binding material. The binding material may be in the form of what is commonly known as refractory bonding clay or potters' clay in moist or plastic form. When such a binder is used, I find that very satisfactory results are obtained by employing a quantity of binding material or bonding clay equivalent to approximately 3 to 10 per cent. of the bulk of the entire mass. The material thus obtained, either with or without bonding clay, but, by preference containing the binder or bonding clay as above indicated, is adapted to be used for making heat-insulating bricks, blocks, or walls of furnaces or other structures. The material or mixture in its calcined, baked or burned condition, and with the diatomaceous earth baked or burned, and used preferably with asbestos, is molded or formed into the shape in which it is intended to be used. The molding may be accomplished by means of an ordinary brick-molding or brick-pressing machine, which machines are well known, and it is therefore deemed unnecessary to illustrate or describe the same in this application, in order to enable the invention to be understood. After molding the material, the material or article in its molded form, or in the shape in which it is intended to remain, may be again subjected to a further operation of burning at a suitable temperature such, for instance, as approximately 2000° F. to 3000° F., more or less, for any desired suitable length of time, for instance, approximately six hours more or less. Such second or final burning or calcining operation will not cause the material to shrink or warp to any appreciable extent, if at all.

By making the material or mixture herein described, sufficiently soft and plastic by the introduction of a sufficient quantity or proportion of liquid or moistening material, the said material or mixture forms a very satisfactory and desirable heat-insulating cement adapted for use in laying heat-resisting bricks, or blocks, and for making heat-insulating walls of such material, or for other purposes.

The calcined baked or burned diatomaceous earth, after having been subjected to a temperature of approximately 2000° F. to 3000° F., more or less, and, by preference in excess of the highest temperature to which the material is intended to be subjected in use, for a period of from 9 to 144 hours, or a sufficient length of time to produce the desired degree of hardness, and said material having been comminuted or crushed to a finely divided state preferably before being calcined and before being intermixed with the asbestos, and then intermixed with finely divided asbestos in a raw or unbaked, unburned and uncalcined state, or in a calcined state, and in any desired suitable proportions, and either with or without a binder, such, for instance, as refractory or bonding clay, is adapted to be handled and sold and dealt in or used in its dry form, or before being molded or formed into the shape in which it is intended to be used, and before being softened or rendered plastic by moistening with liquid or by the mixing of any moist binder or plastic material therewith; and it may be moistened or rendered plastic, and then molded or formed into shape in which it is intended to be used, if desired, at any convenient place and whenever desired.

It is obvious that the material consisting of calcined diatomaceous earth in a finely divided state intermixed with finely divided asbestos in either a raw uncalcined or in a calcined state, is adapted to be used in dry form as a heat-insulating material or filler for furnace walls, or blast ovens, or for other similar structures or purposes.

After the material containing the diatomaceous earth, or diatomaceous earth and asbestos with or without the binder, composed of bonding clay or equivalent material, has been calcined or burned before being molded, and then molded,—or whether molded or not—the article or articles thus obtained may be again burned or subjected to the action of great heat, either in the operation of further burning the same or while in actual use for heat-resisting or heat-insulating purposes, without causing the article or articles or structure thus obtained to shrink, warp or become distorted.

Bricks, slabs, blocks or similar articles uniformly burned or calcined throughout and which may be of much greater thickness or dimensions than could be otherwise obtained may thus be obtained by calcining or burning the material—either the diatomaceous earth, or both the diatomaceous earth and the asbestos both in a finely divided state—before molding or using the same.

The advantage and importance of thus being able to obtain finished articles or structures of the exact size and dimensions desired, and uniformly burned or calcined throughout regardless of the dimensions or thickness of such articles, and the freedom from shrinkage, warping and distortion thus obtained will be readily understood and appreciated by those skilled in the art.

By calcining or burning the material before molding, less time is required in burning or calcining than is the case when the material is molded before being calcined, baked or burned.

From the foregoing description it will be readily understood that the material or mixture comprising diatomaceous earth, or diatomaceous earth and a binder, such, for instance, as refractory or bonding clay, or diatomaceous earth calcined or burned and then intermixed with finely divided asbestos in either raw or baked, calcined or burned condition, the calcined diatomaceous earth being also disintegrated or in a finely divided condition,—whether used in dry form, or molded or formed, or intended to be moistened and molded or formed or spread or applied in the form of a cement or otherwise, after the calcining, baking or burning of the diatomaceous earth or the mixture,— may contain said materials in any suitable proportions, and may be burned for any desired length of time and at any desired suitable temperature such as will result in the production of a simple, economical and efficient heat-insulating composition or material, when treated in the manner herein described.

I have found in practice that a mixture containing finely divided calcined diatomaceous earth approximately 75 per cent.; asbestos finely divided or fibrous, either baked and calcined or raw and unbaked, but, by preference, calcined, baked or burned as above described, approximately 25 per cent.; and either with or without a binder such as refractory or bonding clay equivalent in bulk to approximately 3 per cent. to 10 per cent. of the mass of diatomaceous earth and asbestos, all intermixed, and either in dry form, or moistened and molded, by preference, while subjected to suitable pressure as already indicated, or formed into the desired shape, is satisfactory for the purposes for which the material and articles or structures containing the same are intended.

In the finished product the diatomaceous earth serves as a very efficient heat-insulating or heat-resisting medium; the asbestos, being of a fibrous nature, serves to some extent as a binder, and also as a refractory fire-proof or heat-resisting medium; and said elements intermixed and calcined, form a light, strong cellular structure or heat-insulating body. The binder, consisting of or containing refractory bonding clay or its equivalent, serves to hold the particles of finely divided calcined diatomaceous earth and the particles of asbestos in rigid adhesive or cohering contact or relation, and also serves as a heat-resisting medium, and adds to the strength of the structure.

When the material is intended to be used as a cement it should, of course, be softened or rendered plastic by moistening to a greater extent or by the introduction of a larger proportion of liquid or binding material than when prepared for molding.

The texture of the finished product, whether consisting of intermixed calcined diatomaceous earth in a finely divided state and finely divided asbestos intermixed and forming a compound which has never been moistened or molded but packed as it would be when in use as a filler for a furnace wall or blast oven wall, or similar structure, or as it would appear when compressed into the form of a brick or heat-insulating block, is such that a multiplicity of minute air cells are present in the material.

I claim:

1. A heat-insulating block formed of a heat-resisting composition consisting of finely divided calcined diatomaceous earth, and finely divided calcined asbestos, and a binder of fire-resisting material, all intermixed, compressed together and forming a rigid structure.

2. A heat-insulating block formed of a heat-resisting composition consisting of finely divided burned diatomaceous earth, finely divided burned asbestos, and a binder containing bonding clay, all intermixed and compressed, and forming a rigid non-shrinking structure.

3. A heat-insulating composition consisting of finely divided calcined diatomaceous earth, finely divided asbestos, and a binder.

4. A heat-insulating composition consisting of finely divided calcined diatomaceous earth, finely divided calcined asbestos, and a binder consisting of fire-resisting material.

Signed at Milwaukee, county of Milwaukee, and State of Wisconsin, this 28th day of September, 1918.

FRANK A. HEADSON.

Witnesses:
C. R. MANVILLE,
ALB. S. MILLER.